(12) United States Patent
Katz et al.

(10) Patent No.: US 8,660,362 B2
(45) Date of Patent: Feb. 25, 2014

(54) COMBINED DEPTH FILTERING AND SUPER RESOLUTION

(75) Inventors: Sagi Katz, Yokneam Ilit (IL); Avishai Adler, Haifa (IL); Giora Yahav, Haifa (IL)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 13/301,412

(22) Filed: Nov. 21, 2011

(65) Prior Publication Data

US 2013/0129224 A1    May 23, 2013

(51) Int. Cl.
*G06K 9/48* (2006.01)
*G06K 9/40* (2006.01)

(52) U.S. Cl.
USPC .......................................... 382/199; 382/268

(58) Field of Classification Search
USPC ......... 382/154, 199, 268, 274, 275, 309, 316; 345/419–420
See application file for complete search history.

(56) References Cited

U.S. PATENT DOCUMENTS

| | | | |
|---|---|---|---|
| 6,990,681 B2 * | 1/2006 | Wang et al. ................ | 725/105 |
| 2006/0221250 A1 | 10/2006 | Rossbach et al. | |
| 2006/0239558 A1 | 10/2006 | Rafii et al. | |
| 2009/0167923 A1 | 7/2009 | Safaee-Rad et al. | |
| 2010/0194856 A1 | 8/2010 | Varekamp | |
| 2011/0080491 A1 | 4/2011 | Drazic et al. | |
| 2011/0157169 A1 * | 6/2011 | Bennett et al. ............. | 345/419 |
| 2011/0187819 A1 | 8/2011 | Katz et al. | |
| 2011/0285813 A1 * | 11/2011 | Girdzijauskas et al. ...... | 348/42 |
| 2012/0056982 A1 * | 3/2012 | Katz et al. ................ | 348/43 |
| 2012/0293624 A1 * | 11/2012 | Chen et al. .................. | 348/46 |
| 2013/0050181 A1 * | 2/2013 | Glynn et al. ............... | 345/419 |
| 2013/0127823 A1 * | 5/2013 | Diverdi et al. ............. | 345/419 |

OTHER PUBLICATIONS

Choi, et al., "2D-Plus-Depth Based Resolution and Frame-rate Up-conversion Technique for Depth Video", In Proceedings of IEEE Consumer Electronics Society, vol. 56, Issue 4, Dec. 23, 2010, pp. 2489-2497.

Schuon, et al., "High-quality Scanning Using Time-of-flight Depth Superresolution", In Proceedings of IEEE Computer Society Conference on Computer Vision and Pattern Recognition Workshops, Jul. 23-28, 2008, pp. 1-7.

* cited by examiner

*Primary Examiner* — Daniel Mariam
(74) *Attorney, Agent, or Firm* — Judy Yee; Peter Taylor; Micky Minhas

(57) ABSTRACT

Systems and methods for increasing the resolution of a depth map by identifying and updating false depth pixels are described. In some embodiments, a depth pixel of the depth map is initially assigned a confidence value based on curvature values and localized contrast information. The curvature values may be generated by applying a Laplacian filter or other edge detection filter to the depth pixel and its neighboring pixels. The localized contrast information may be generated by determining a difference between the maximum and minimum depth values associated with the depth pixel and its neighboring pixels. A false depth pixel may be identified by comparing a confidence value associated with the false depth pixel with a particular threshold. The false depth pixel may be updated by assigning a new depth value based on an extrapolation of depth values associated with neighboring pixel locations.

20 Claims, 13 Drawing Sheets

| z1 | z2 | z3 |
|----|----|----|
| z4 | z5 | z6 |
| z7 | z8 | z9 |

FIG. 5A

| -1 | -2 | -1 |
|----|----|----|
| 0  | 0  | 0  |
| 1  | 2  | 1  |

FIG. 5B

| -1 | 0 | 1 |
|----|---|---|
| -2 | 0 | 2 |
| -1 | 0 | 1 |

FIG. 5C

| 0  | -1 | 0  |
|----|----|----|
| -1 | 4  | -1 |
| 0  | -1 | 0  |

COMBINED DEPTH FILTERING AND SUPER RESOLUTION

BACKGROUND

A depth map typically comprises a two-dimensional image of an environment that includes depth information relating to the distances to objects within the environment from a particular reference point. The particular reference point may be associated with an image capture device. Each pixel in the two-dimensional image may be associated with a depth value representing a linear distance from the particular reference point. A variety of techniques may be used to generate a depth map such as structured light illumination and time of flight techniques.

Structured light illumination involves projecting a light pattern into an environment, capturing an image of the reflected light pattern, and then determining distance information from the spacings and/or distortions associated with the reflected light pattern relative to the projected light pattern. The light pattern may be projected using light that is invisible to the naked eye (e.g., IR or UV light) and may comprise a single dot, a single line, or a variety of dimensional patterns (e.g., horizontal and vertical lines, or checkerboard patterns). In some cases, several different light patterns may be necessary to generate accurate depth information.

Time of flight techniques may determine distances to objects within an environment by timing how long it takes for light transmitted from a light source to travel to the objects and reflect back to an image sensor. In some cases, a short light pulse (or series of light pulses) may be projected into the environment at a first point in time and reflections associated with the short light pulse may be captured at a second point in time after the first point in time. A time of flight system may adjust the time difference between the first point in time and the second point in time in order to detect objects at a particular distance (or over a range of distances) associated with the time difference.

SUMMARY

Technology is described for improving the image quality of a depth map by detecting and modifying false depth values within the depth map. In some cases, a depth pixel of the depth map is initially assigned a confidence value based on curvature values and localized contrast information. The curvature values may be generated by applying a Laplacian filter or other edge detection filter to the depth pixel and its neighboring pixels. The localized contrast information may be generated by determining a difference between the maximum and minimum depth values associated with the depth pixel and its neighboring pixels. A false depth pixel may be identified by comparing a confidence value associated with the false depth pixel with a particular threshold. The false depth pixel may be updated by assigning a new depth value based on an extrapolation of depth values associated with neighboring pixel locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5A depicts a 3×3 image region including depth pixels $z1$ through $z9$.

FIG. 5B depicts one example of a derivative filter for computing a vertical gradient.

FIG. 5C depicts one example of a derivative filter for computing a horizontal gradient.

FIG. 5D depicts one example of a derivative filter for computing a second-order derivative.

DETAILED DESCRIPTION

Technology is described for increasing the resolution of a depth map by identifying and updating false depth pixels within the depth map. In some embodiments, a depth pixel of the depth map is initially assigned a confidence value based on curvature values and localized contrast information. The curvature values may be generated by applying a Laplacian filter or other edge detection filter to the depth pixel and its neighboring pixels. The localized contrast information may be generated by determining a difference between the maximum and minimum depth values associated with the depth pixel and its neighboring pixels. A false depth pixel may be identified by comparing a confidence value associated with the false depth pixel with a particular threshold. The false depth pixel may be updated by assigning a new depth value based on an extrapolation of depth values associated with neighboring pixel locations.

One issue involving the generation of depth information using time of flight techniques relates to the inherent trade-off between minimizing noise (i.e., generating higher quality depth maps) and image resolution. In particular, larger pixel sizes may reduce noise by allowing for a greater number of photons to be sensed within a particular period of time. However, the larger pixel sizes come at the expense of reduced image resolution. Thus, there is a need for increasing the resolution of a depth map without sacrificing image quality.

Figure 1:
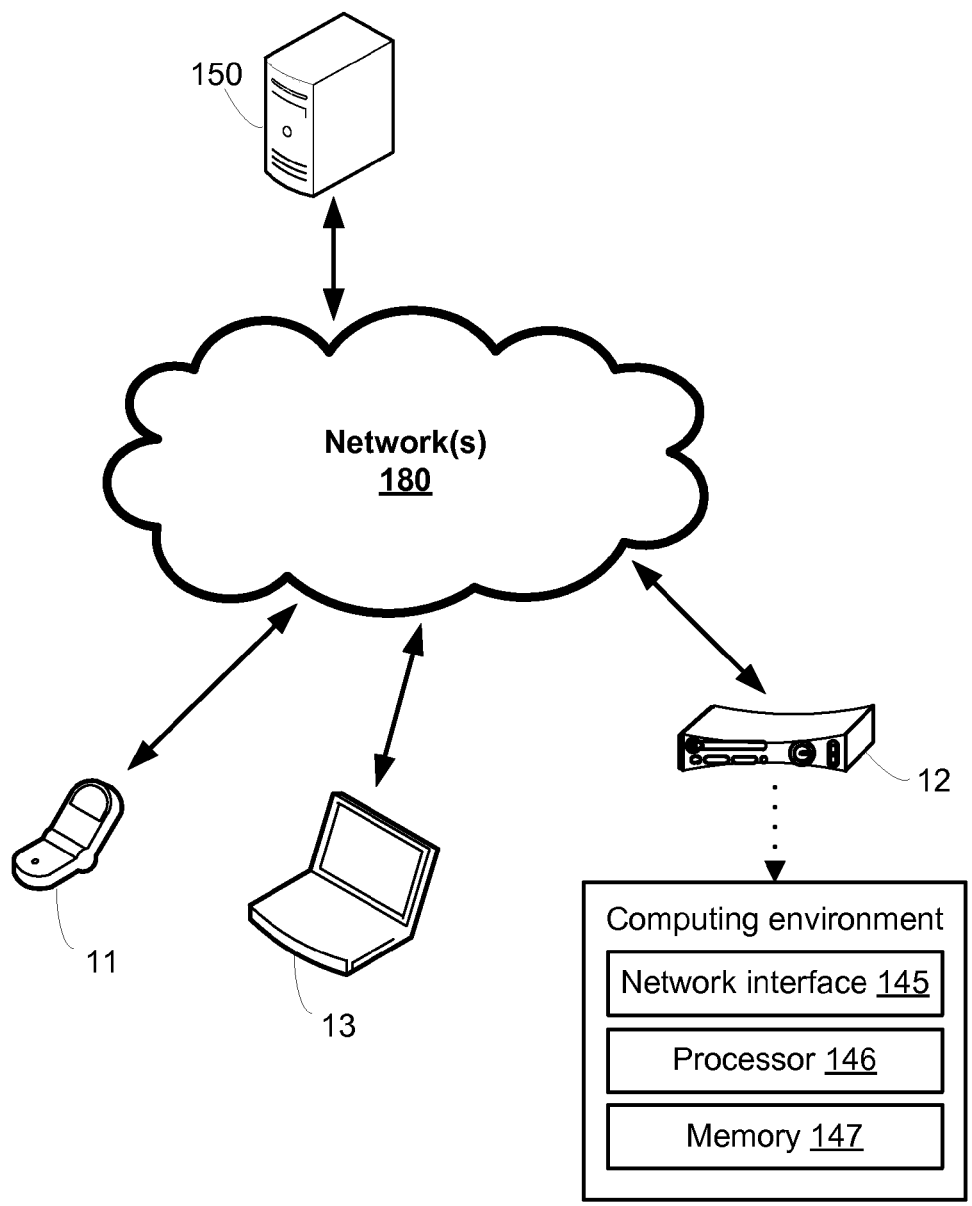
FIG. 1 is a block diagram of one embodiment of a networked computing environment in which the disclosed technology may be practiced.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, computing environment 12, mobile device 13, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of computing environment 12 includes a network interface 145, processor 146, and memory 147, all in communication with each other. Network interface 145 allows computing environment 12 to connect to one or more networks 180. Network interface 145 may include a wireless network interface, a modem, and/or a wired network interface. Processor 146 allows computing environment 12 to execute computer readable instructions stored in memory 147 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In some embodiments, computing environment 12 may increase the resolution of a single frame depth image by identifying and updating false depth pixels within the single frame depth image. The false depth pixels may exist for a variety of reasons. For example, a false depth value associated with a false depth pixel may be generated due to several locations in space being integrated into the same pixel location. (i.e., due to resolution limitations). A depth pixel may be considered false if it is associated with a depth value that does not exist within an environment (e.g., it represents an incorrect depth value that is between a foreground object and a background object). The single frame depth image may comprise a depth map.

Figure 2:
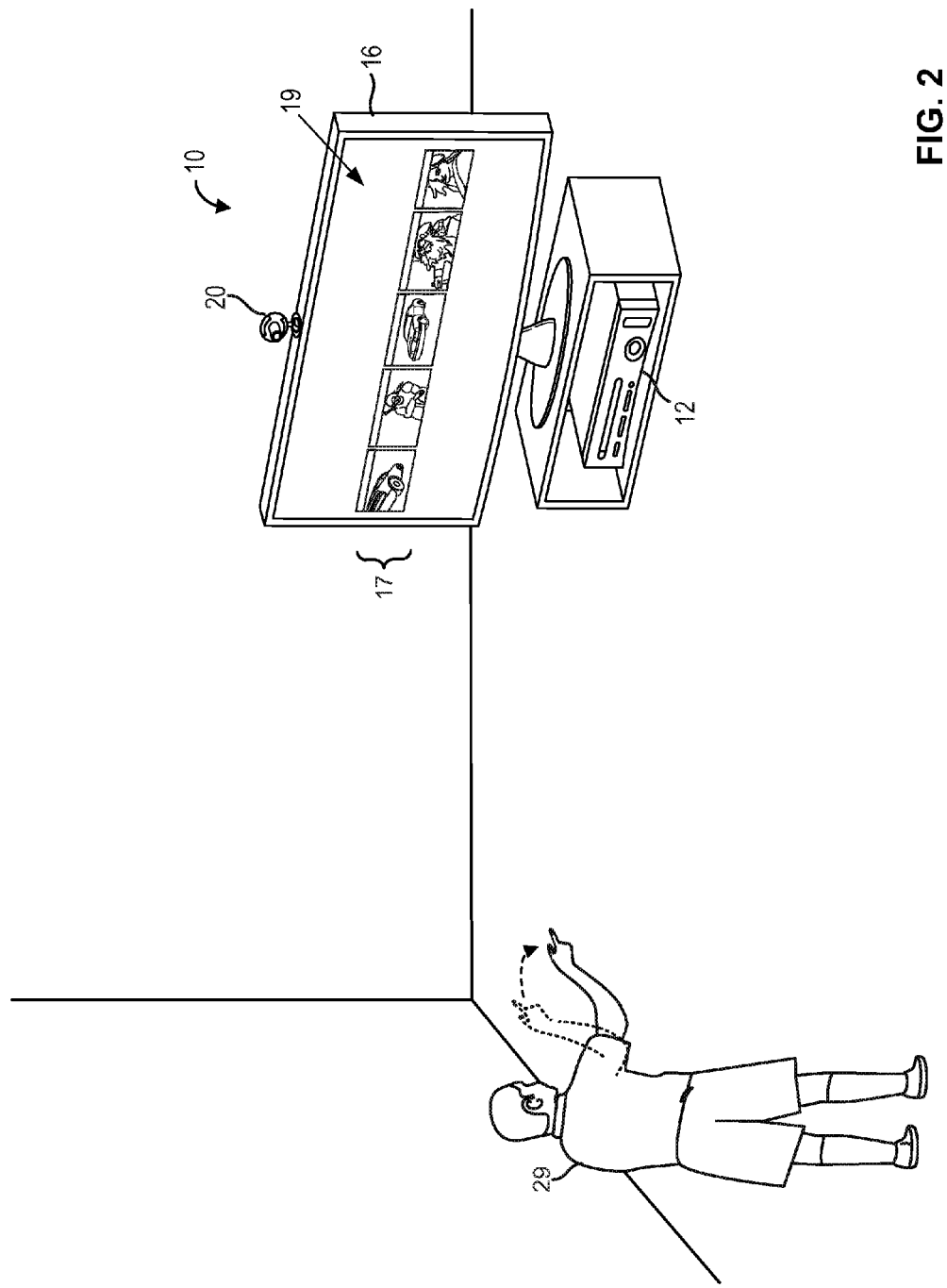
FIG. 2 depicts one embodiment of a computing system that utilizes one or more depth maps for performing object and/or gesture recognition.

FIG. 2 depicts one embodiment of a computing system 10 that utilizes one or more depth maps for performing object and/or gesture recognition. The computing system 10 may include a computing environment 12, a capture device 20, and a display 16, all in communication with each other. Computing environment 12 may include one or more processors. Capture device 20 may include one or more color or depth sensing cameras that may be used to visually monitor one or more targets including humans and one or more other real objects within a particular environment. Capture device 20 may also include a microphone. In one example, capture device 20 may include a depth sensing camera and a microphone and computing environment 12 may comprise a gaming console.

In some embodiments, the capture device 20 may include an active illumination depth camera, which may use a variety of techniques in order to generate a depth map of an environment or to otherwise obtain depth information associated the environment including the distances to objects within the environment from a particular reference point. The techniques for generating depth information may include structured light illumination techniques and time of flight (TOF) techniques.

As depicted in FIG. 2, a user interface 19 is displayed on display 16 such that an end user 29 of the computing system 10 may control a computing application running on computing environment 12. The user interface 19 includes images 17 representing user selectable icons. In one embodiment, computing system 10 utilizes one or more depth maps in order to detect a particular gesture being performed by end user 29. In response to detecting the particular gesture, the computing system 10 may execute a new computing application. The particular gesture may include selection of one of the user selectable icons.

Figure 3:
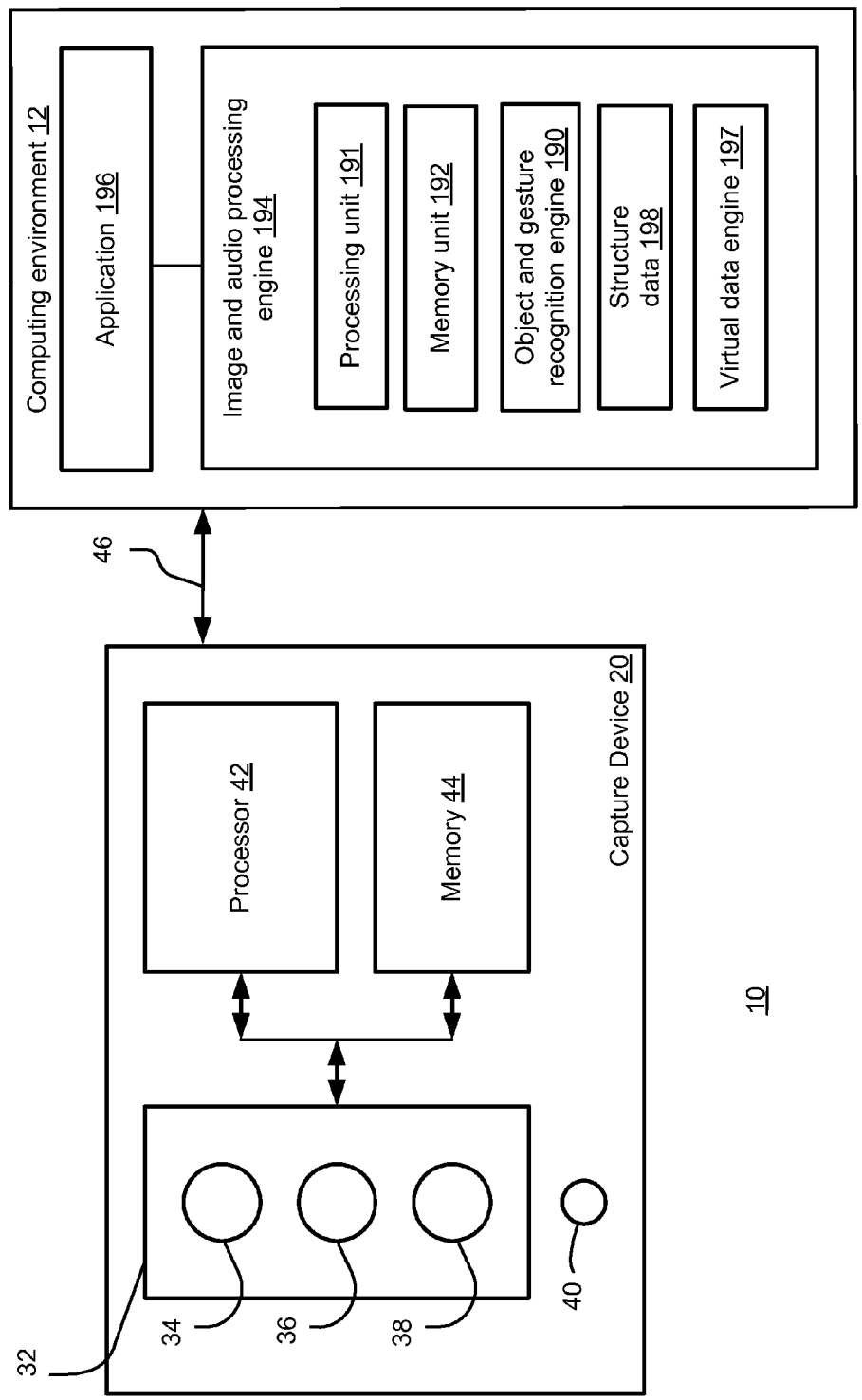
FIG. 3 illustrates one embodiment of computing system including a capture device and computing environment.

FIG. 3 illustrates one embodiment of computing system 10 including a capture device 20 and computing environment 12. In some embodiments, capture device 20 and computing environment 12 may be integrated within a single computing device. The single computing device may be a mobile device, such as mobile device 11 in FIG. 1.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and/or voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structure data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting objects and performing gesture recognition can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 4A:
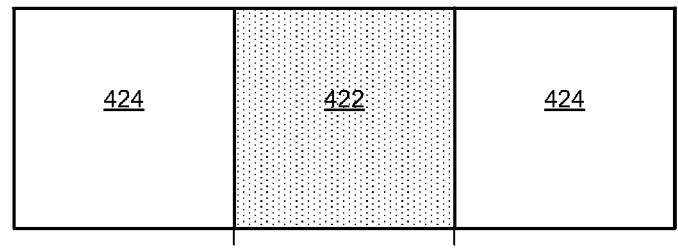
FIG. 4A depicts a depth map including one or more near pixels and one or more far pixels.

FIGS. 4A-4D illustrate the detecting of depth boundaries or depth edges within a depth map utilizing derivative filters. FIG. 4A depicts a depth map including one or more near pixels 422 and one or more far pixels 424. The one or more near pixels 422 may be associated with an object that is close to a depth camera. The one or more far pixels 424 may be associated with a background of an environment in which the object exists.

Figure 4B:
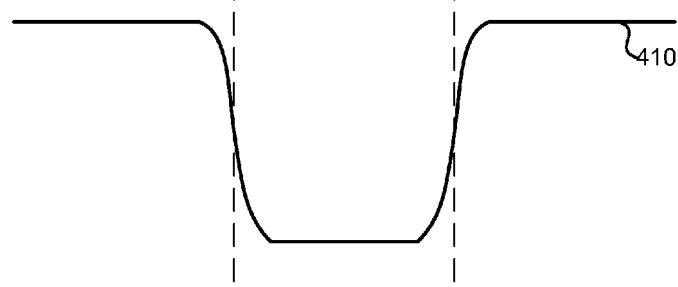
FIG. 4B depicts a depth profile along a horizontal scan line through the depth map depicted in FIG. 4A.

FIG. 4B depicts a depth profile 410 along a horizontal scan line through the depth map depicted in FIG. 4A. As depicted, the depth values associated with the one or more far pixels 424 are greater than the depth values associated with the one or more near pixels 422. For example, the one or more far pixels 424 may be associated with a depth value of 20 feet and the one or more near pixels 422 may be associated with a depth value of 5 feet. It should be noted that the depth profile 410 includes a relatively smooth transition, rather than an abrupt change, in the depth values associated with the depth map of FIG. 4A. This is due to the fact that the depth edges may be slightly blurred due to sampling limitations of the depth camera or due to resolution limitations of a depth camera causing several locations in space to be integrated into a single pixel location. The pixel locations close to the depth edges are assigned false depth values between the depth values associated with the one or more far pixels 424 and the one or more near pixels 422. For example, pixel locations near the depth edges may be assigned a depth value of 12 feet rather than a correct depth value of either 5 feet or 20 feet.

Figure 4C:
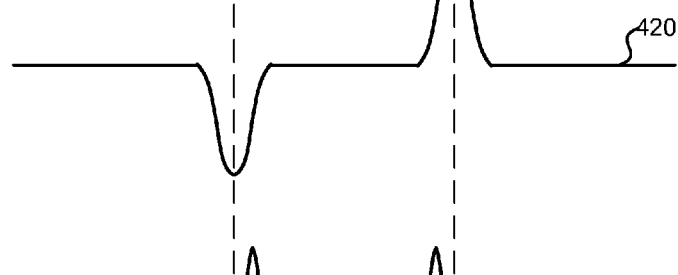
FIG. 4C depicts a first derivative of the depth profile of FIG. 4B.

FIG. 4C depicts a first derivative 420 of the depth profile 410 of FIG. 4B. As depicted, the first derivative 420 is negative at the depth boundary transitioning from pixels associated with a high depth value (i.e., the depth values associated with the one or more far pixels 424) to pixels associated with a low depth value (i.e., the depth values associated with the one or more near pixels 422). Conversely, the first derivative 420 is positive at the depth boundary transitioning from pixels associated with a low depth value to pixels associated with a high depth value. The first derivative 420 is zero in the pixel areas associated with a constant depth value. Thus, the magnitude of the first derivative 420 may be used to detect the presence of a depth edge in a depth map.

Figure 4D:
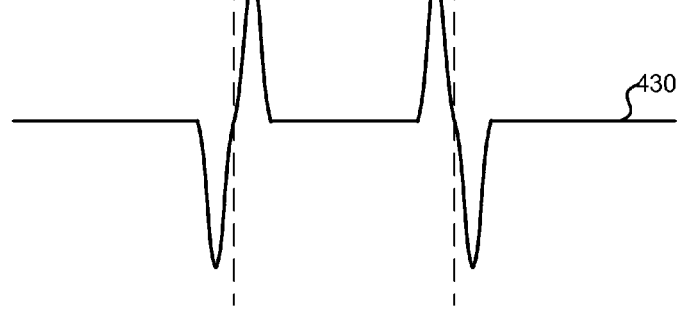
FIG. 4D depicts a second derivative of the depth profile of FIG. 4B.

FIG. 4D depicts a second derivative 430 of the depth profile 410 of FIG. 4B. As depicted, the second derivative 430 contains a zero crossing associated with the depth edges of the depth map. The second derivative 430 is positive for the portions of the boundary transition associated with the one or more near pixels 422, negative for the portions of the boundary transition associated with the one or more far pixels 424, and zero in pixel areas associated with a constant depth value. Thus, the sign of the second derivative 430 may be used to determine whether a pixel located near a depth edge should be associated with the one or more near pixels 422 or the one or more far pixels 424. Furthermore, the zero crossings of the second derivative 430 may be used to detect the presence of a depth edge in a depth map. In one embodiment, the second derivative 430 may be generated using a Laplacian filter.

FIG. 5A depicts a 3×3 image region including depth pixels z1 through z9. The 3×3 image region may comprise a center pixel z5 and its eight neighboring pixels located a distance of one pixel away from the center pixel z5. Although a 3×3 image region is described in FIGS. 5A-5D, the filters depicted in FIGS. 5B-5D may be modified and applied to other image regions such as a 5×5 image region.

FIGS. 5B-5D illustrate various examples of derivative filters that may be applied to a depth map. FIG. 5B depicts one example of a derivative filter for computing a vertical gradient associated with center pixel z5. The vertical gradient may be expressed as $G(y)=(z7+2*z8+z9)-(z1+2*z2+z3)$. FIG. 5C depicts one example of a derivative filter for computing a horizontal gradient associated with center pixel z5. The horizontal gradient may be expressed as $G(x)=(z3+2*z6+z9)-(z1+2*z4+z7)$. The first-order derivative filter of FIG. 5C is one example of a derivative filter for generating first derivative 420 in FIG. 4C. The derivative filters depicted in FIGS. 5B-5C may be referred to as Sobel operators. FIG. 5D depicts one example of a derivative filter for computing a second-order derivative associated with center pixel z5. The second-order derivative may be expressed as $\nabla^2 f=4*z5-(z2+z4+z6+z8)$. The derivative filter depicted in FIG. 5D is one example of a Laplacian filter.

Application of each of the derivative filters depicted in FIGS. 5B-5D generates a single filter value for a particular center pixel. To get filter values for one or more other pixels in a depth map, the derivative filters may be moved to align with each of the one or more other pixels. Application of the derivative filters to pixels on a border of a depth map may be performed using the appropriate neighboring pixels.

Figure 6A:
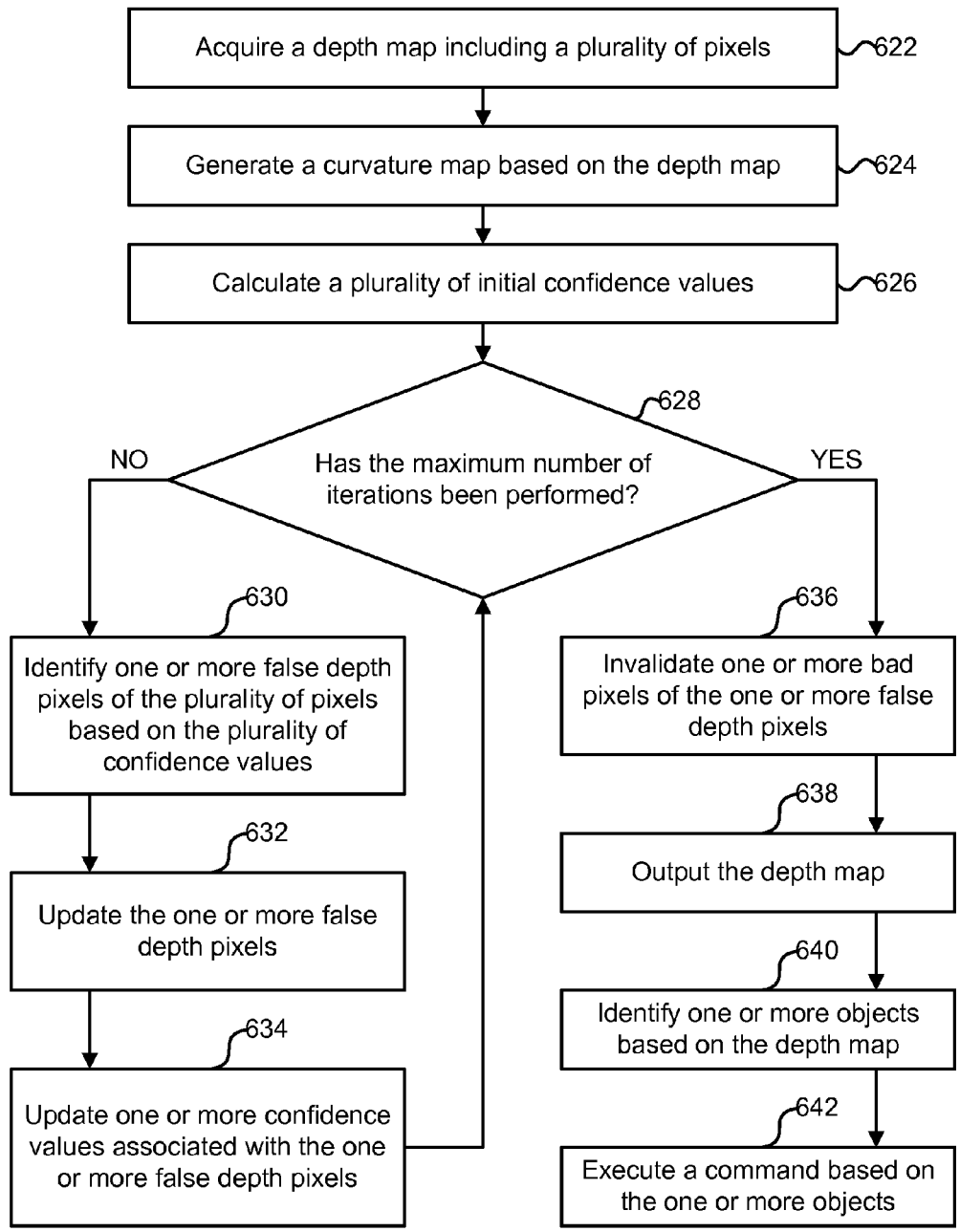
FIG. 6A is a flowchart describing one embodiment of a process for identifying and updating false depth pixels in a depth map.

FIG. 6A is a flowchart describing one embodiment of a process for identifying and updating false depth pixels within a depth map. The process of FIG. 6A may be performed continuously and by one or more computing devices. Each step in the process of FIG. 6A may be performed by the same or different computing devices as those used in other steps, and each step need not necessarily be performed by a single computing device. In one embodiment, the process of FIG.

6A is performed by a computing environment such as computing environment 12 in FIG. 1.

In step 622, a depth map including a plurality of pixels is acquired. The depth map may be acquired from a capture device such as capture device 20 in FIG. 3. The capture device may utilize various techniques in order to generate depth information including sensing data using a depth camera to create the depth map. In step 624, a curvature map based on the depth map is generated. In one embodiment, the curvature map may be generated by applying a Laplacian filter to the depth map acquired in step 622. Other second-order derivative filters may also be used to generate a curvature map based on the depth map.

In step 626, a plurality of initial confidence values is calculated. In some embodiments, an initial confidence value may be assigned to a particular pixel of the plurality of pixels. The initial confidence value may be calculated based on one or more curvature values associated with the curvature map generated in step 624. In one example, if a curvature value associated with the particular pixel and one or more curvature values associated with one or more neighboring pixels of the particular pixel are all zero or less than a particular threshold, then the initial confidence value assigned to the particular pixel may be a high confidence value (e.g., a 95% confidence that the particular pixel is not near a depth edge). In another example, if a magnitude of the curvature value associated with the particular pixel is greater than a particular threshold, then the initial confidence value assigned to the particular pixel may be a low confidence value (e.g., a 25% confidence that the particular pixel is not near a depth edge).

In some embodiments, zero crossings associated with the one or more curvature values may be used to detect the presence of a depth edge or boundary. In some cases, a zero crossing may be detected when depth pixels within a particular image region (e.g., a 3×3 image region) are associated with both positive curvature values and negative curvature values. Based on the detection of a depth edge, the initial confidence value assigned to a particular pixel of the plurality of pixels may be a low confidence value if the particular pixel is within a particular distance of the depth edge.

In some embodiments, initializing the plurality of confidence values may include assigning to each depth pixel of the plurality of pixels an initial confidence value based on curvature values associated with the curvature map and localized image contrast values associated with the depth map acquired in step 622. In this case, a curvature filter (e.g., comprising a 3×3 kernel) may be applied to each depth pixel and its neighboring pixels in order to generate a curvature filter output and a local image contrast filter (e.g., comprising a 5×5 kernel) may be applied to each depth pixel and its neighboring pixels in order to generate a local image contrast filter output. The local image contrast filter output may correspond with the difference between the maximum and minimum depth values within a particular image region covered by the local image contrast filter. In general, a higher local image contrast may result in a lower initial confidence value. The initial confidence value assigned to each depth pixel may be determined as a function of the curvature filter output and the local image contrast filter output. In one example, the curvature filter output and the local image contrast filter output may be used as inputs to a decaying exponential function in order to determine the initial confidence value for a particular depth pixel.

In step 628, it is determined whether the maximum number of iterations has been performed. If the maximum number of iterations has not been performed then step 630 is performed. Otherwise, if the maximum number of iterations has been performed then step 636 is performed. In step 630, one or more false depth pixels of the plurality of pixels are identified based on a plurality of confidence values. In one embodiment, a false depth pixel of the one or more false depth pixels may be identified if a confidence value associated with the false depth pixel is less than a particular confidence threshold.

In step 632, the one or more false depth pixels are updated. Updating a false depth pixel may include identifying one or more neighboring pixels of the false depth pixel, acquiring one or more confidence values associated with the one or more neighboring pixels, and determining a new depth value based on the one or more neighboring pixels. In some embodiment, a false depth pixel of the one or more false depth pixels may be updated by assigning a new depth value based on an extrapolation of depth values associated with the one or more neighboring pixels. One embodiment of a process for updating one or more false depth pixels is described later in reference to FIG. 7B.

In step 634, one or more confidence values associated with the one or more false depth pixels are updated. A particular confidence value of the one or more confidence values may be updated based on other confidence values associated with the neighboring pixels from which the updated depth value was determined. For example, a particular confidence value may be updated by assigning a new confidence value based on an average confidence value associated with the neighboring pixels from which the updated depth value was determined.

In step 636, one or more bad pixels of the one or more false depth pixels are invalidated. A bad pixel of the one or more bad pixels may be invalidated if a confidence value associated with the bad pixel is below a particular invalidating threshold. For example, each of the one or more false depth pixels associated with a confidence value below 25% may be invalidated. An invalidated pixel may be represented by a non-numerical value in order to indicate that the bad pixel has been invalidated.

In step 638, the updated depth map is outputted. In some cases, the updated depth map may comprise an updated version of the depth map acquired in step 622. In other cases, the updated depth map may be based on a copied version of the depth map acquired in step 622. The updated depth map may be outputted for further processing by a computing system such as computing system 10 in FIG. 3.

In step 640, one or more objects are identified based on the depth map outputted in step 638. The one or more objects may be identified via object recognition. In step 642, a command is executed on a computing system, such as computing system 10 in FIG. 3, in response to the one or more objects being identified in step 640. The command may be associated with a particular computing application. The particular computing application may control the displaying of the one or more objects on a display device.

Figure 6B:
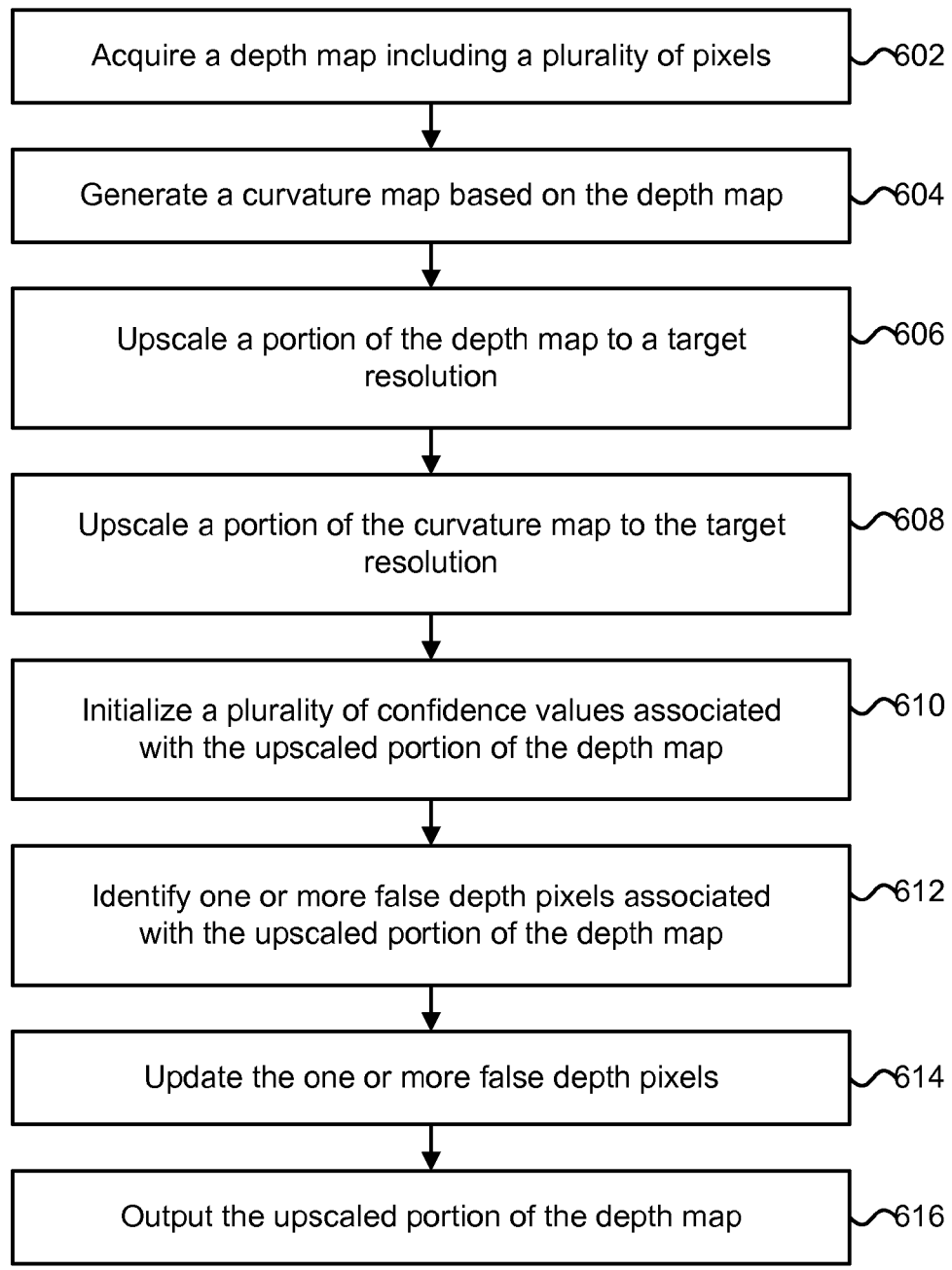
FIG. 6B is a flowchart describing an alternative embodiment of a process for identifying and updating false depth pixels in a depth map.

FIG. 6B is a flowchart describing an alternative embodiment of a process for identifying and updating false depth pixels within a depth map. The process of FIG. 6B may be performed continuously and by one or more computing devices. Each step in the process of FIG. 6B may be performed by the same or different computing devices as those used in other steps, and each step need not necessarily be performed by a single computing device. In one embodiment, the process of FIG. 6B is performed by a computing environment such as computing environment 12 in FIG. 1.

In step 602, a depth map including a plurality of pixels is acquired. The depth map may be acquired from a capture device such as capture device 20 in FIG. 3. The capture device may utilize various techniques in order to generate depth information including sensing data using a depth camera to create the depth map. In step 604, a curvature map based on the depth map is generated. In one embodiment, the curvature map may be generated by applying a Laplacian filter to the depth map acquired in step 602. Other second-order derivative filters may also be used to generate a curvature map based on the depth map.

In step 606, a portion of the depth map acquired in step 602 is upscaled to a target resolution. The portion of the depth map may be upscaled via bilinear sampling or bilinear interpolation. In step 608, a portion of the curvature map generated in step 604 is upscaled to the target resolution. The portion of the curvature map may be upscaled via bilinear sampling or bilinear interpolation.

In step 610, a plurality of initial confidence values associated with the upscaled portion of the depth map determined in step 606 is initialized. In some embodiments, an initial confidence value assigned to a particular pixel of the plurality of pixels may be based on one or more curvature values associated with the curvature map generated in step 604. In one example, if a curvature value associated with the particular pixel and one or more curvature values associated with one or more neighboring pixels of the particular pixel are all zero or less than a particular threshold, then the initial confidence value assigned to the particular pixel may be a high confidence value (e.g., a 95% confidence that the particular pixel is not near a depth edge). In another example, if a magnitude of the curvature value associated with the particular pixel is greater than a particular threshold, then the initial confidence value assigned to the particular pixel may be a low confidence value (e.g., a 25% confidence that the particular pixel is not near a depth edge).

In some embodiments, zero crossings associated with the one or more curvature values may be used to detect the presence of a depth edge or boundary. In some cases, a zero crossing may be detected when depth pixels within a particular image region (e.g., a 3×3 image region) are associated with both positive curvature values and negative curvature values. Based on the detection of a depth edge, the initial confidence value assigned to a particular pixel of the plurality of pixels may be a low confidence value if the particular pixel is within a particular distance of the depth edge.

In some embodiments, initializing the plurality of confidence values may include assigning to each depth pixel of the plurality of pixels an initial confidence value based on curvature values associated with the curvature map and localized image contrast values associated with the depth map acquired in step 602. In this case, a curvature filter (e.g., comprising a 3×3 kernel) may be applied to each depth pixel and its neighboring pixels in order to generate a curvature filter output and a local image contrast filter (e.g., comprising a 5×5 kernel) may be applied to each depth pixel and its neighboring pixels in order to generate a local image contrast filter output. The local image contrast filter output may correspond with the difference between the maximum and minimum depth values within a particular image region covered by the local image contrast filter. In general, a higher local image contrast may result in a lower initial confidence value. The initial confidence value assigned to each depth pixel may be determined as a function of the curvature filter output and the local image contrast filter output. In one example, the curvature filter output and the local image contrast filter output may be used as inputs to a decaying exponential function in order to determine the initial confidence value for a particular depth pixel.

In step 612, one or more false depth pixels associated with the upscaled portion of the depth map determined in step 606 are identified. The one or more false depth pixels may be identified based on the plurality of confidence values determined in step 610. In one embodiment, a false depth pixel of the one or more false depth pixels may be identified if a confidence value associated with the false depth pixel is less than a particular confidence threshold.

In step 614, the one or more false depth pixels are updated. Updating a false depth pixel may include identifying one or more neighboring pixels of the false depth pixel, acquiring one or more confidence values associated with the one or more neighboring pixels, and determining a new depth value based on the one or more neighboring pixels. In some embodiment, a false depth pixel of the one or more false depth pixels may be updated by assigning a new depth value based on an extrapolation of depth values associated with the one or more neighboring pixels. One embodiment of a process for updating one or more false depth pixels is described later in reference to FIG. 7B.

In step 616, the upscaled portion of the depth map is outputted. In some cases, the outputted depth map may comprise an updated version of the depth map acquired in step 602. The outputted depth map may be outputted for further processing by a computing system such as computing system 10 in FIG. 3.

Figure 7A:
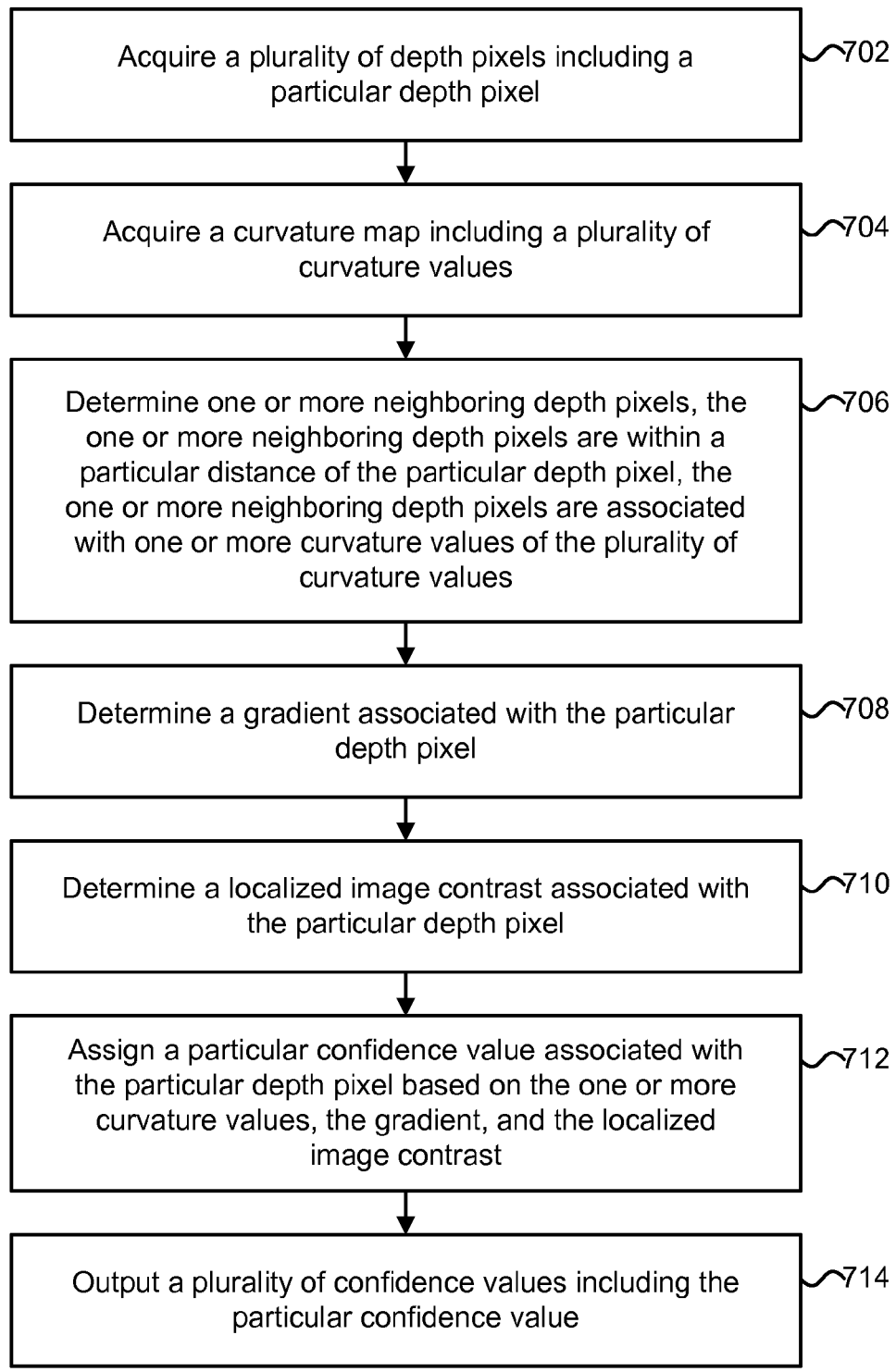
FIG. 7A is a flowchart describing one embodiment of a process for calculating a plurality of confidence values.

FIG. 7A is a flowchart describing one embodiment of a process for calculating a plurality of confidence values. The process described in FIG. 7A is one example of a process for implementing step 626 in FIG. 6A or for implementing step 610 in FIG. 6B. The process of FIG. 7A may be performed continuously and by one or more computing devices. Each step in the process of FIG. 7A may be performed by the same or different computing devices as those used in other steps, and each step need not necessarily be performed by a single computing device. In one embodiment, the process of FIG. 7A is performed by a computing environment such as computing environment 12 in FIG. 1.

In step 702, a plurality of depth pixels including a particular depth pixel is acquired. In step 704, a curvature map including a plurality of curvature values is acquired. In step 706, one or more neighboring depth pixels are determined. The one or more neighboring depth pixels may be within a particular distance of the particular depth pixel acquired in step 702. For example, the one or more neighboring depth pixels may comprise the eight neighboring pixels located a distance of one pixel away from the particular depth pixel. The one or more neighboring depth pixels may be associated with one or more curvature values of the plurality of curvature values acquired in step 704.

In step 708, a gradient associated with the particular depth pixel is determined. The gradient may be determined using a first-order derivative filter such as the derivative filters depicted in FIGS. 5B-5C. In step 710, a localized image contrast associated with the particular depth pixel is determined. The localized image contrast may be determined by calculating the difference between the maximum and minimum depth values within a particular image region centered around the particular depth pixel.

In step 712, a particular confidence value associated with the particular depth pixel is assigned. The particular confidence value may be based on the one or more curvature values determined in step 706, the gradient determined in step 708, and/or the localized image contrast determined in step 710. A higher gradient and localized image contrast may result in a lower particular confidence value. In one embodiment, the particular confidence value may be determined using a decaying exponential function and utilizing the gradient and the localized image contrast as inputs to the decaying exponential function. In step 714, a plurality of confidence values including the particular confidence value assigned in step 712 is outputted.

Figure 7B:
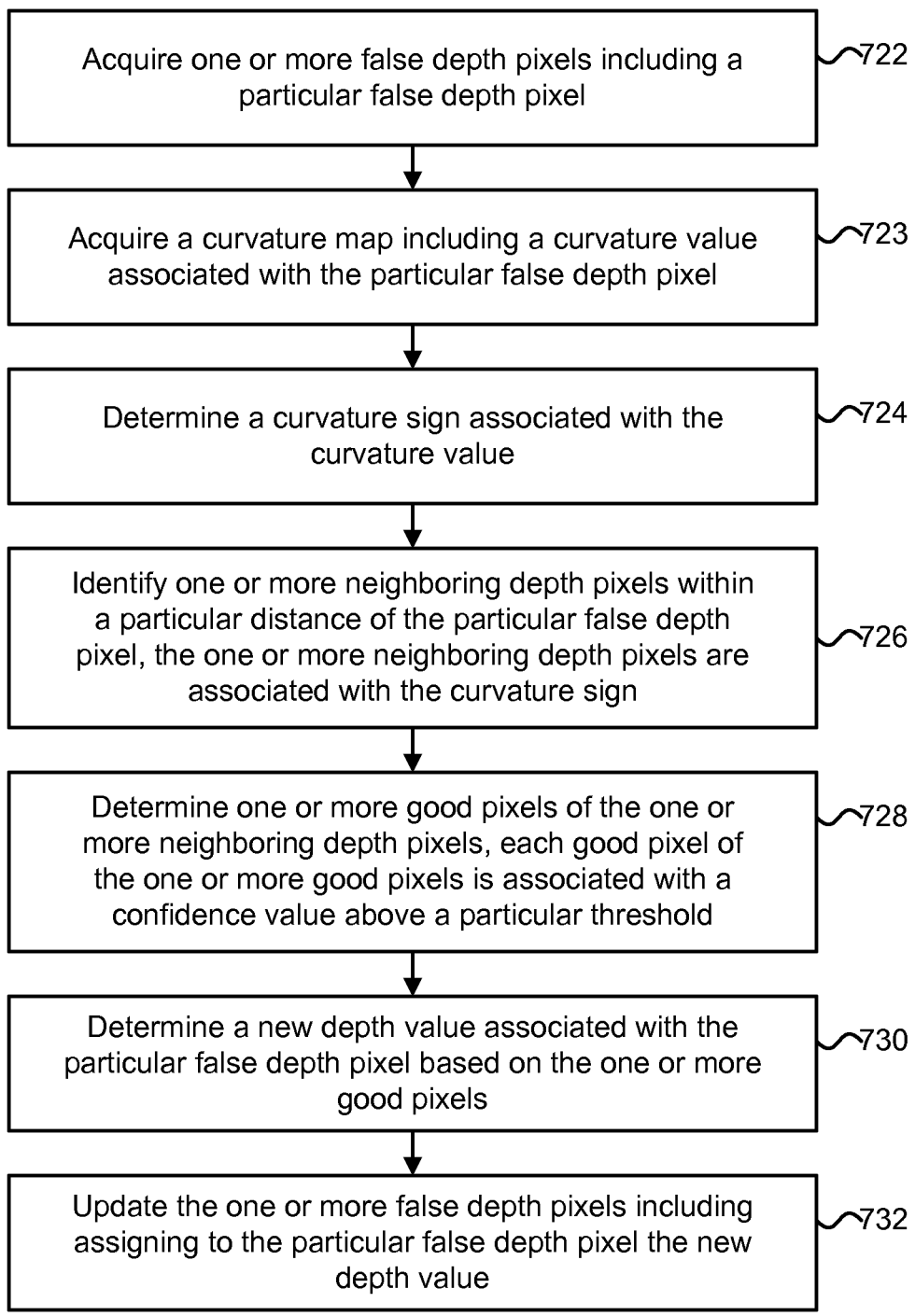
FIG. 7B is a flowchart describing one embodiment of a process for updating one or more false depth pixels.

FIG. 7B is a flowchart describing one embodiment of a process for updating one or more false depth pixels. The process described in FIG. 7B is one example of a process for implementing step 632 in FIG. 6A or for implementing step 614 in FIG. 6B. The process of FIG. 7B may be performed continuously and by one or more computing devices. Each step in the process of FIG. 7B may be performed by the same or different computing devices as those used in other steps, and each step need not necessarily be performed by a single computing device. In one embodiment, the process of FIG. 7B is performed by a computing environment such as computing environment 12 in FIG. 1.

In step 722, one or more false depth pixels including a particular false depth pixel are acquired. In step 723, a curvature map including a curvature value associated with the particular false depth pixel is acquired. In step 724, a curvature sign associated with the curvature value is determined. The curvature sign associated with a positive (negative) curvature value is determined to be positive (negative).

In step 726, one or more neighboring depth pixels within a particular distance of the particular false depth pixel are identified. The one or more neighboring depth pixels may be associated with the same curvature sign. For example, the one or more neighboring depth pixels may comprise three out of the eight possible pixels within a distance of one pixel from the particular false depth pixel that are all associated with a negative curvature sign. In some cases, the one or more neighboring depth pixels may comprise neighboring depth pixels on the same side of a depth edge as the particular false depth pixel.

In step 728, one or more good pixels of the one or more neighboring depth pixels are determined. Each good pixel of the one or more good pixels is associated with a confidence value above a particular threshold. The one or more good pixels may comprise neighboring depth pixels on the same side of a depth edge as the particular false depth pixel that have each been assigned a confidence value greater than a particular confidence threshold.

In step 730, a new depth value associated with the particular false depth pixel is determined. The new depth value may be extrapolated from depth values associated with the one or more good pixels. One embodiment of a process for determining a new depth value given one or more good pixels is described later in reference to FIG. 7C. In step 732, the one or more false depth pixels are updated including assigning to the particular false depth pixel the new depth value.

Figure 7C:
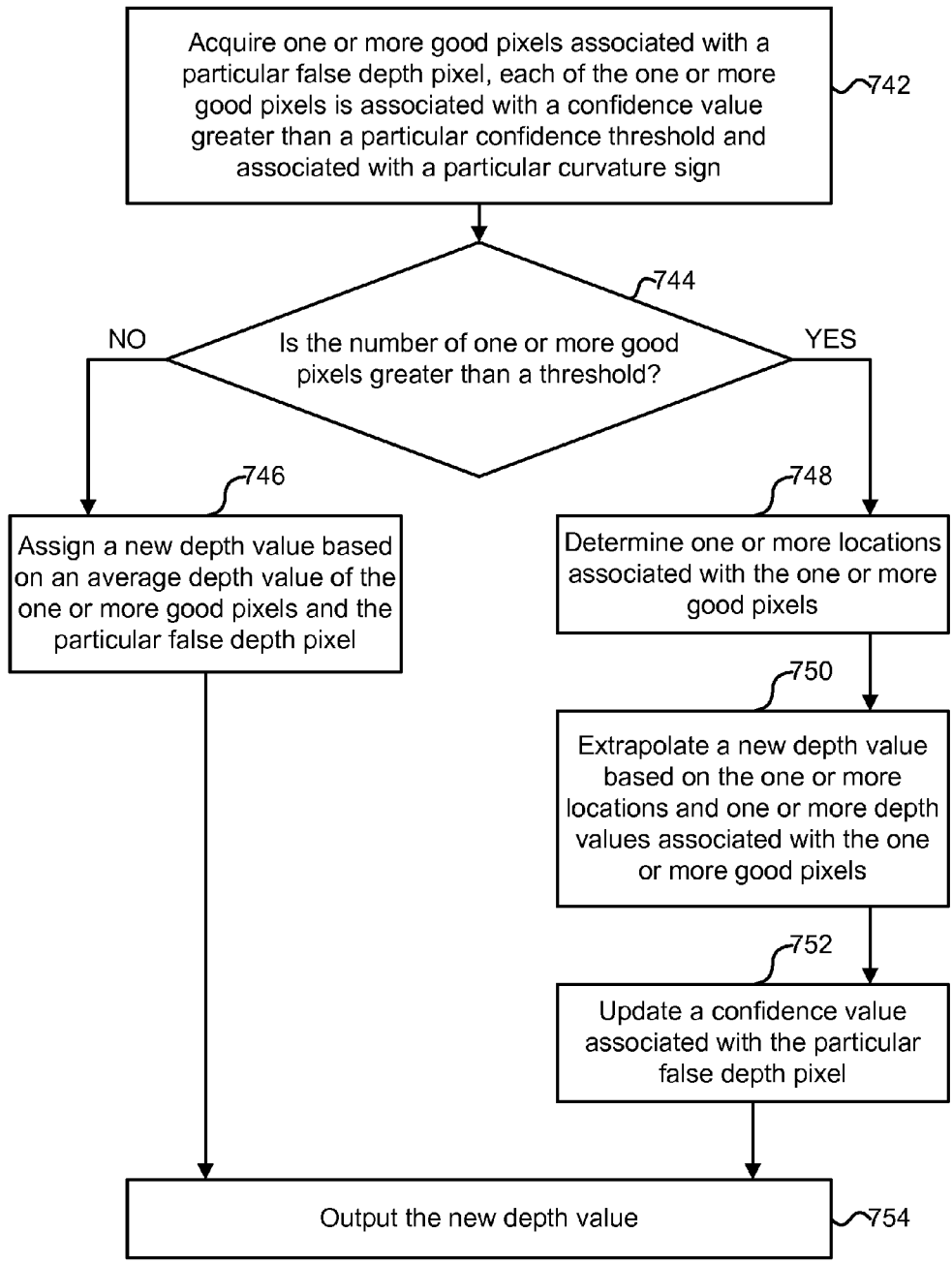
FIG. 7C is a flowchart describing one embodiment of a process for determining a new depth value given one or more good pixels.

FIG. 7C is a flowchart describing one embodiment of a process for determining a new depth value given one or more good pixels. The process described in FIG. 7C is one example of a process for implementing step 730 in FIG. 7B. The process of FIG. 7C may be performed continuously and by one or more computing devices. Each step in the process of FIG. 7C may be performed by the same or different computing devices as those used in other steps, and each step need not necessarily be performed by a single computing device. In one embodiment, the process of FIG. 7C is performed by a computing environment such as computing environment 12 in FIG. 1.

In step 742, one or more good pixels associated with a particular false depth pixel are acquired. Each of the one or more good pixels may be associated with a confidence value greater than a particular confidence threshold. Each of the one or more good pixels may be associated with a particular curvature sign (e.g., a positive or negative curvature sign).

In step 744, it is determined whether the number of one or more good pixels is greater than a threshold. For example, it may be determined whether the number of one or more good pixels is greater than three pixels within an image region comprising nine pixels. If it is determined that the number of one or more good pixels is greater than the threshold, then step 748 is performed. Otherwise, if it is determined that the number of one or more good pixels is not greater than the threshold, then step 746 is performed.

In step 746, a new depth value is assigned based on an average depth value of the one or more good pixels and the particular false depth pixel. In some cases, step 746 may be omitted and therefore a new depth value will not be assigned.

In step 748, one or more locations associated with the one or more good pixels are determined. In step 750, a new depth value is extrapolated based on the one or more locations determined in step 748 and one or more depth values associated with the one or more good pixels. The extrapolation of the new depth value may be performed utilizing various extrapolation methods including linear extrapolation and polynomial extrapolation.

In step 752, a confidence value associated with the particular false depth pixel is updated. The confidence value may be updated based on an average confidence value associated with the one or more good pixels from which the new depth value was determined. In step 754, the new depth value is outputted.

One embodiment of the disclosed technology includes acquiring a depth map of an environment including a plurality of pixels, identifying one or more false depth pixels of the plurality of pixels, updating the one or more false depth pixels including updating one or more depth values associated with the one or more false depth pixels, and identifying one or more objects within the environment based on the depth map.

One embodiment of the disclosed technology includes a receiver and one or more processors. The receiver receives a depth map including a plurality of pixels. The one or more processors generate a curvature map based on the depth map and initialize a plurality of confidence values based on the curvature map. Each confidence value of the plurality of confidence values is associated with a different pixel of the plurality of pixels. The one or more processors identify one or more false depth pixels of the plurality of pixels based on the plurality of confidence values and update the one or more false depth pixels.

One embodiment of the disclosed technology includes acquiring a depth map of an environment, generating a curvature map based on the depth map, upscaling a portion of the depth map to a target resolution, the portion of the depth map includes a plurality of pixels, and upscaling a portion of the curvature map to the target resolution. The portion of the curvature map includes a plurality of curvature values. The method further includes initializing a plurality of confidence values based on the plurality of curvature values. Each confidence value of the plurality of confidence values is associated with a different pixel of the plurality of pixels. The method further includes identifying one or more false depth pixels of the plurality of pixels based on the plurality of confidence values, updating the one or more false depth pixels including updating one or more depth values associated with the one or more false depth pixels and identifying one or more objects within the environment based on the portion of the depth map.

Figure 8:
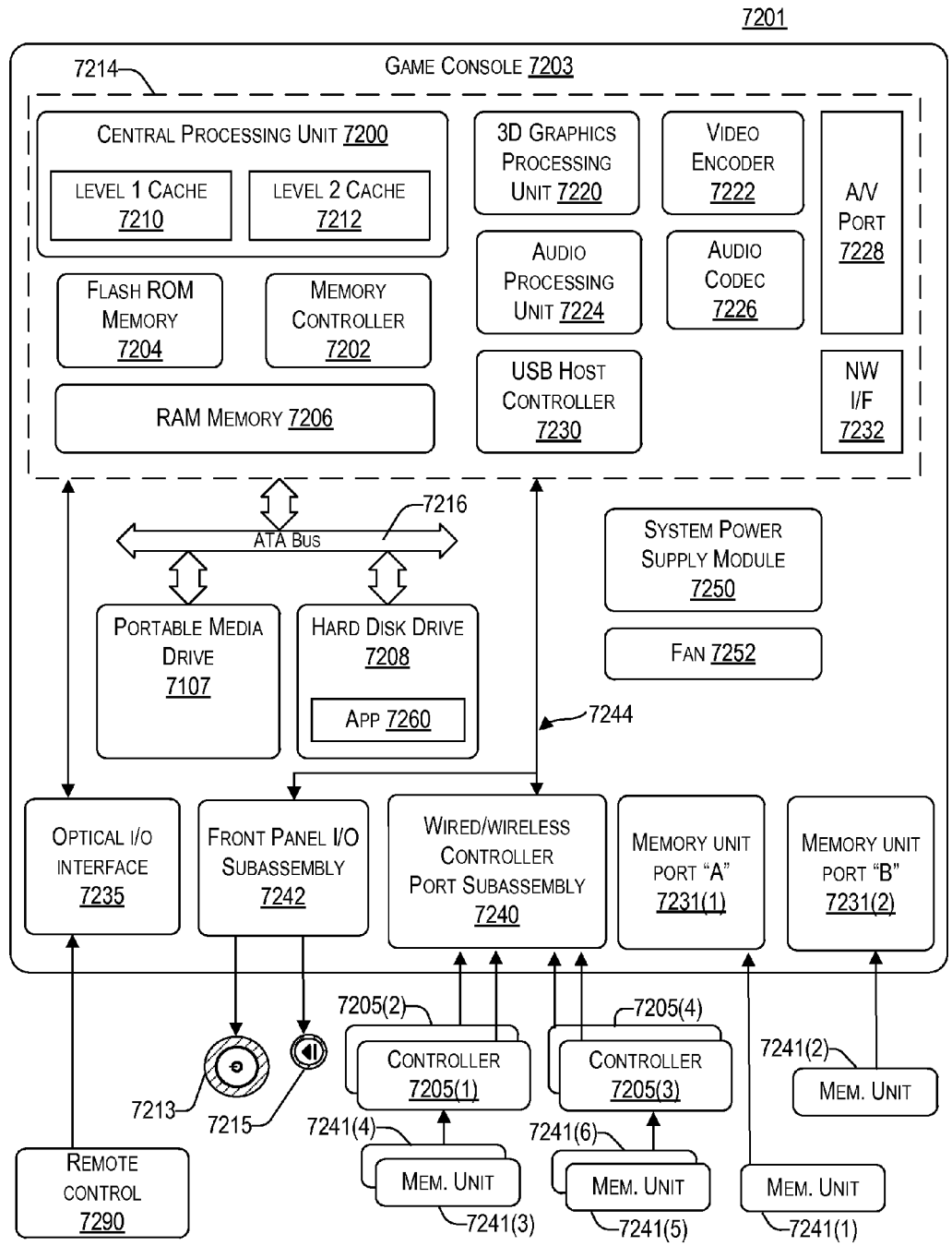
FIG. 8 is a block diagram of an embodiment of a gaming and media system.
Figure 9:
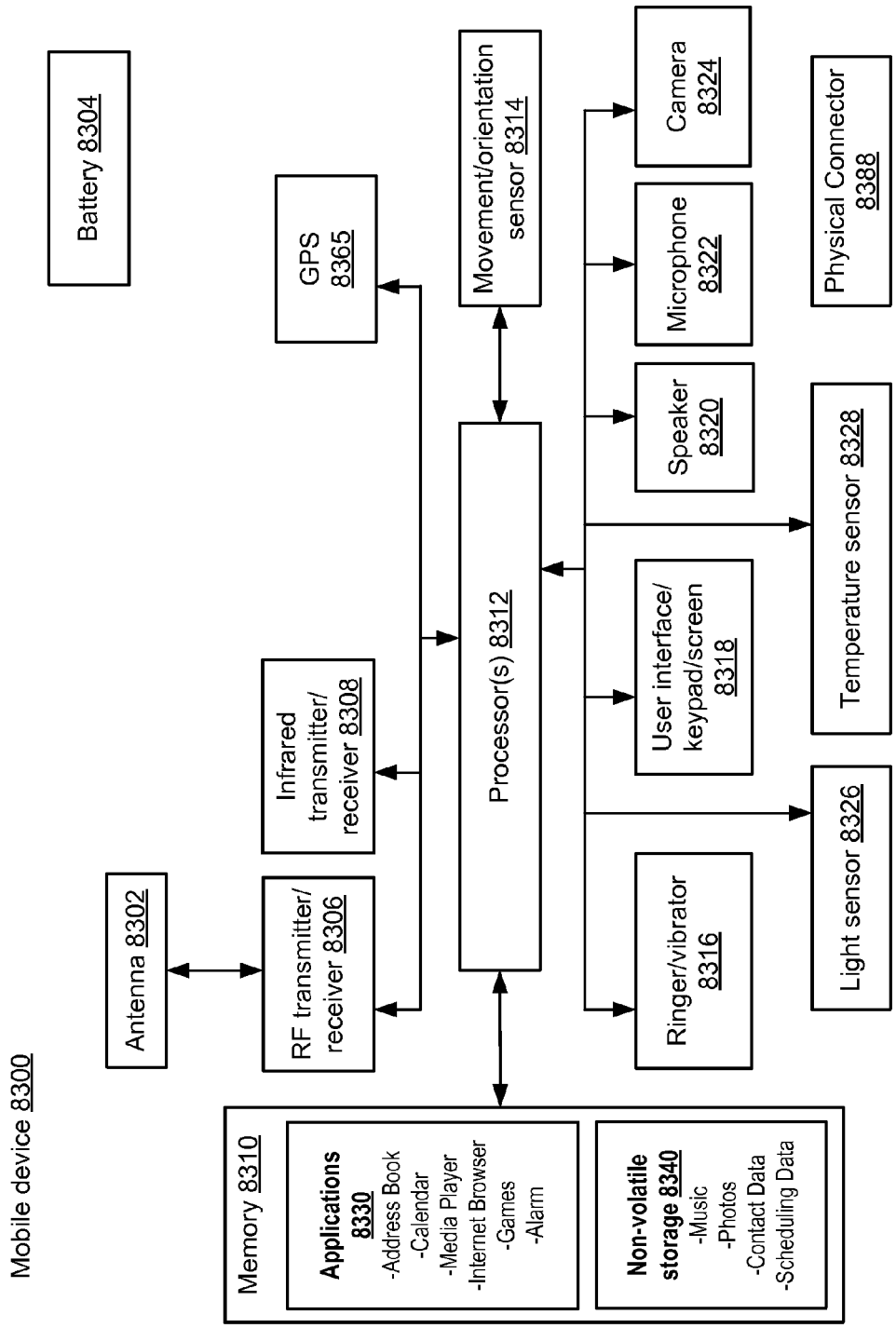
FIG. 9 is a block diagram of one embodiment of a mobile device.
Figure 10:
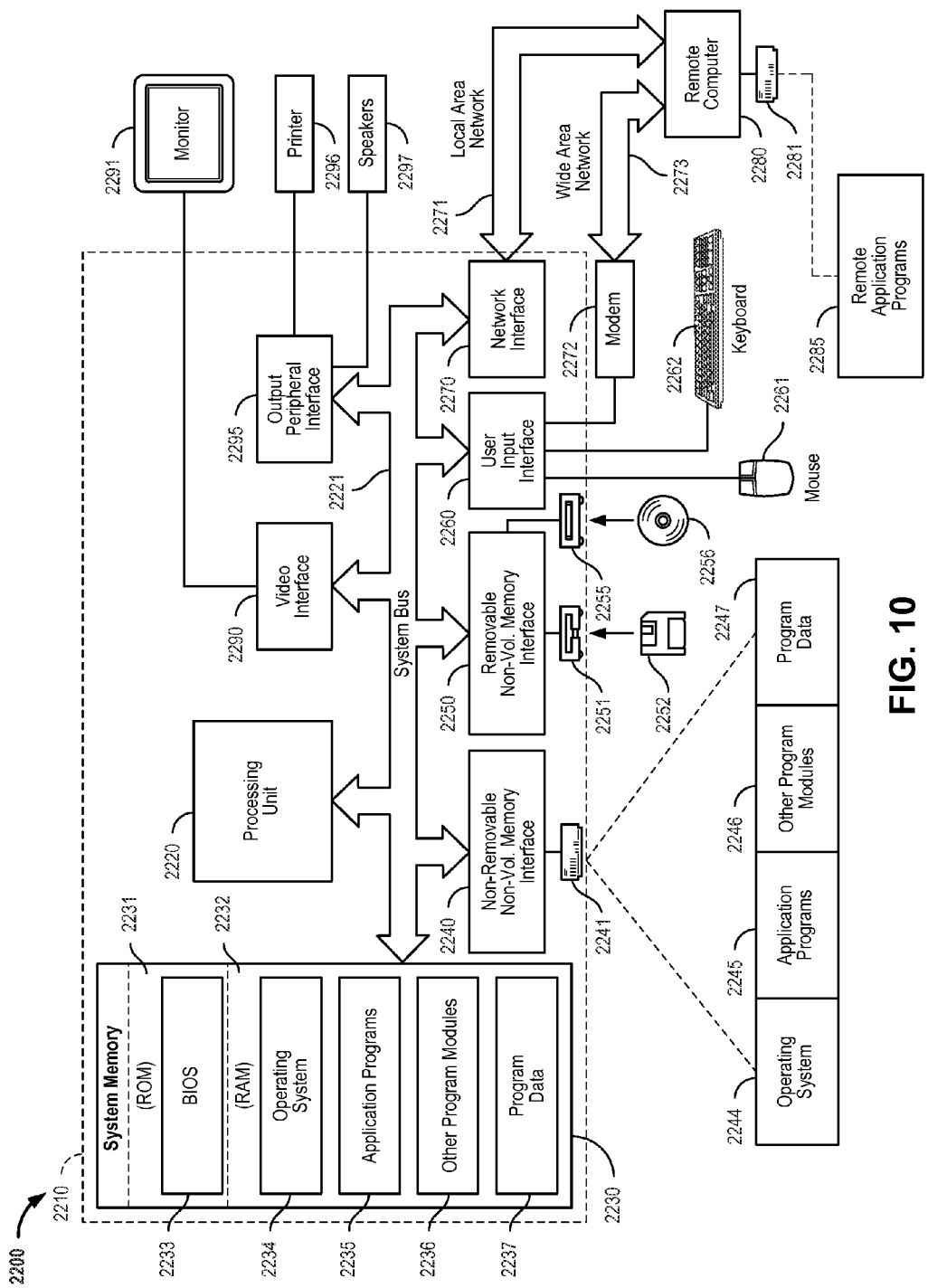
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201, which is one example of computing environment 12 in FIG. 3. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300, such as a mobile version of computing system 10 in FIG. 3. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing system 10 in FIG. 3. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology may be operational with numerous other general purpose or special purpose computing system environments. Examples of other computing system environments that may be suitable for use with the disclosed technology include, but are not limited to, personal computers, server computers, hand-held or laptop devices, multiprocessor systems, microprocessor-based systems, programmable consumer electronics, network PCs, minicomputers, mainframe computers, and distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for improving depth information, comprising:
acquiring a depth map of an environment, the depth map includes a plurality of pixels;
generating a curvature map based on the depth map;
identifying one or more false depth pixels of the plurality of pixels, each of the one or more false depth pixels is located within a particular distance of a depth edge of the depth map;
calculating a plurality of confidence values based on the curvature map, each confidence value of the plurality of confidence values is associated with a different pixel of the plurality of pixels, the identifying one or more false depth pixels includes identifying the one or more false depth pixels based on the plurality of confidence values, the calculating a plurality of confidence values includes assigning to each confidence value of the plurality of confidence values an initial confidence value based on the curvature map and a localized image contrast;
updating the one or more false depth pixels, the updating the one or more false depth pixels includes updating a particular false depth pixel of the one or more false depth pixels based on one or more neighboring pixels of the particular false depth pixel; and
identifying one or more objects within the environment based on the depth map, the identifying one or more objects is performed subsequent to the updating the one or more false depth pixels.

2. The method of claim 1, wherein:
the generating a curvature map includes applying a Laplacian filter to the depth map.

3. The method of claim 2, further comprising:
invalidating one or more bad pixels of the one or more false depth pixels, the invalidating one or more bad pixels includes invalidating a particular bad pixel if a confidence value associated with the particular bad pixel is below a particular invalidating threshold.

4. The method of claim 2, further comprising:
upscaling at least a portion of the depth map to a target resolution prior to performing the calculating a plurality of confidence values; and
upscaling at least a portion of the curvature map to the target resolution prior to performing the calculating a plurality of confidence values.

5. The method of claim 1, wherein:
the localized image contrast is determined based on a difference between a maximum depth value and a minimum depth value associated with a group of the plurality of pixels centered around a particular depth pixel.

6. The method of claim 1, wherein:
the identifying one or more false depth pixels includes determining whether the particular false depth pixel of the one or more false depth pixels is associated with a confidence value that is less than a particular confidence threshold.

7. The method of claim 1, wherein:
the updating a particular false depth pixel includes acquiring one or more confidence values associated with the one or more neighboring pixels, identifying a group of the one or more neighboring pixels based on the one or more confidence values, and determining a new depth value based on the group of the one or more neighboring pixels.

8. The method of claim 7, wherein:
the determining a new depth value includes extrapolating the new depth value based on one or more depth values associated with the group of the one or more neighboring pixels.

9. The method of claim 7, wherein:
the particular false depth pixel is associated with a particular curvature sign, each of the one or more neighboring pixels is associated with the particular curvature sign.

10. The method of claim 7, wherein:
the updating the one or more false depth pixels includes updating the one or more confidence values associated with the one or more false depth pixels.

11. The method of claim 1, further comprising:
executing a command on a computing system in response to the identifying one or more objects, the command is associated with controlling a display to modify the display of the one or more objects.

12. A system for improving depth information, comprising:
a receiver, the receiver receives a depth map including a plurality of pixels; and
one or more processors, the one or more processors in communication with the receiver, the one or more processors generate a curvature map based on the depth map, the one or more processors initialize a plurality of confidence values based on the curvature map, each confidence value of the plurality of confidence values is associated with a different pixel of the plurality of pixels, the one or more processors initialize the plurality of confidence values by assigning to each confidence value of the plurality of confidence values an initial confidence value based on the curvature map and a localized image contrast, the one or more processors identify one or more false depth pixels of the plurality of pixels based on the plurality of confidence values, the one or more processors update the one or more false depth pixels.

13. The electronic device of claim 12, wherein:
the one or more processors generate the curvature map by applying a Laplacian filter to the depth map.

14. The electronic device of claim 12, wherein:
the localized image contrast is determined based on a difference between a maximum depth value and a minimum depth value associated with a group of the plurality of pixels centered around a particular depth pixel.

15. One or more storage devices containing processor readable code for programming one or more processors to perform a method for improving depth information comprising the steps of:
acquiring a depth map of an environment;
generating a curvature map based on the depth map;
upscaling a portion of the depth map to a target resolution, the portion of the depth map includes a plurality of pixels;
upscaling a portion of the curvature map to the target resolution, the portion of the curvature map includes a plurality of curvature values;
initializing a plurality of confidence values based on the plurality of curvature values, each confidence value of the plurality of confidence values is associated with a different pixel of the plurality of pixels, the initializing a plurality of confidence values includes assigning to each confidence value of the plurality of confidence values an initial confidence value based on the plurality of curvature values and a localized image contrast;
identifying one or more false depth pixels of the plurality of pixels based on the plurality of confidence values;
updating the one or more false depth pixels, the updating the one or more false depth pixels includes updating one or more depth values associated with the one or more false depth pixels; and
identifying one or more objects within the environment based on the portion of the depth map, the identifying one or more objects is performed subsequent to the updating the one or more false depth pixels.

16. The one or more storage devices of claim 15, wherein:
the generating a curvature map includes applying a Laplacian filter to the depth map.

17. The one or more storage devices of claim 15, wherein:
the localized image contrast is determined based on a difference between a maximum depth value and a minimum depth value associated with a group of the plurality of pixels centered around a particular depth pixel.

18. The one or more storage devices of claim 17, wherein:
the identifying one or more false depth pixels includes determining whether a particular false depth pixel of the one or more false depth pixels is associated with a confidence value that is less than a particular confidence threshold.

19. The one or more storage devices of claim 18, wherein:
the updating the one or more false depth pixels includes updating a particular false depth pixel of the one or more false depth pixels, the updating a particular false depth pixel includes identifying one or more neighboring pixels of the particular false depth pixel, acquiring one or more confidence values associated with the one or more neighboring pixels, and determining a new depth value based on the one or more neighboring pixels.

20. The one or more storage devices of claim 19, wherein:
the determining a new depth value includes extrapolating the new depth value based on one or more depth values associated with the one or more neighboring pixels.

* * * * *